United States Patent [19]

Black

[11] 3,749,212

[45] July 31, 1973

[54] HOLDER FOR DEPRESSING A MOTOR VEHICLE ACCELERATOR

[76] Inventor: Donald L. Black, Rt. 3, Goodlettsville, Tenn.

[22] Filed: Jan. 24, 1972

[21] Appl. No.: 220,132

[52] U.S. Cl.................... 192/3 T, 74/482, 74/532, 188/67
[51] Int. Cl............................................ B60k 29/02
[58] Field of Search...................... 192/3 T; 74/482, 74/513, 529, 532

[56] References Cited
UNITED STATES PATENTS

| | | | |
|---|---|---|---|
| 2,917,142 | 12/1959 | Thorner | 192/3 T |
| 1,707,113 | 3/1929 | Christ | 74/532 |
| 2,671,355 | 3/1954 | Hawkins | 74/532 |
| 2,907,422 | 10/1959 | Gibson | 192/3 T |
| 2,936,866 | 5/1960 | Kelly | 192/3 T |
| 3,075,402 | 1/1963 | Sellars | 74/532 |

Primary Examiner—Benjamin W. Wyche
Attorney—Edwin M. Luedeka et al.

[57] ABSTRACT

Apparatus for depressing the accelerator of a motor vehicle and including frame means having a first portion adapted to extend downwardly from the dashboard of a vehicle and terminate at a point above the accelerator and a second portion laterally offset from the first portion and extending toward the floorboard of the vehicle. This second portion of the frame includes leg means spring biased in an extended position and adapted to contact the floorboard to urge the frame toward the dashboard and maintain the longitudinal axis of the frame oriented generally along a line extending from the dashboard to the accelerator. The device further includes means slidably mounted on the first portion of the frame means and adapted to be moved in a direction generally parallel to the longitudinal axis of the first portion of the frame means to contact the accelerator. Latch means are included to maintain the accelerator contact means in contact with the accelerator.

6 Claims, 4 Drawing Figures

PATENTED JUL 31 1973

3,749,212

HOLDER FOR DEPRESSING A MOTOR VEHICLE ACCELERATOR

This invention relates to apparatus for maintaining the accelerator pedal of a truck or similar vehicle in a constantly depressed position.

As is true with most motor vehicles, the forward progress of the vehicle is maintained by the operator holding the accelerator pedal depressed by means of his foot. In particular with trucks, it is not uncommon that a driver will be required to hold his foot on the accelerator for an extended period of time. Such extended periods of relative nonmovement of the driver's leg and foot obviously result in discomfort to the driver and reportedly increase the overall fatigue of the driver, making him less efficient and attentive to his driving.

It is therefore an object of this invention to provide apparatus which can be activated by the operator of a truck to maintain the accelerator pedal in a selected depressed position. It is a further object to provide apparatus of the type described with a means for rapid deactivation to enable the operator to return to conventional accelerator pedal control. It is a further object to provide apparatus of the type described which can be easily carried by the operator and readily installed in or removed from any vehicle he may select.

Other objects and advantages of the invention will become apparent from the following description including the drawings in which.

Stated briefly, the disclosed apparatus comprises a tubular frame adapted to be removably disposed in an upright position between the floorboard and dashboard of a motor vehicle. The frame includes a bifurcated lower portion defining opposite legs, each of which slidably mounts a rod-like member that is spring-biased in an extended position with respect to its respective leg and which contacts the floorboard near the accelerator. In a preferred embodiment, the legs generally straddle the accelerator. The tubular frame supports a sliding element having a pedal or the like on its bottom end which is adapted to contact and depress the accelerator when the element is moved into position by the driver. Spring means is employed to bias the sliding element out of contact with the accelerator, and releasable catch means is provided to hold the sliding element in position against the accelerator.

Figure 1:
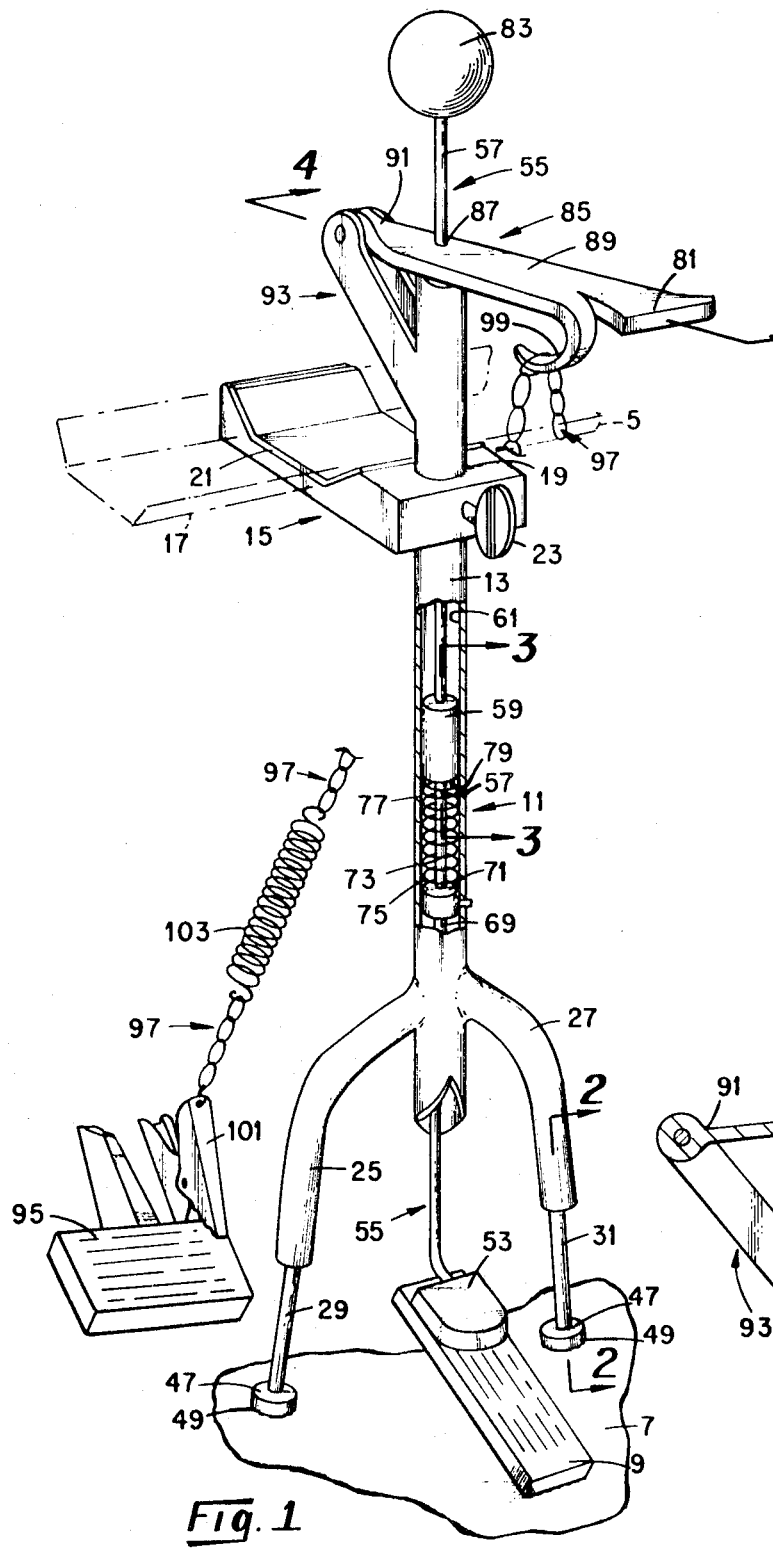
FIG. 1 is a perspective view, part in section, of the disclosed apparatus in an activated position.

Referring to the drawings, FIG. 1 shows the disclosed apparatus installed between the lower side of a dashboard 5 and a floorboard 7 of a motor vehicle (not shown) and in position to depress an accelerator pedal 9. As depicted, the apparatus includes a tubular frame 11 which is disposed in an upright position above the accelerator pedal 9, and is spring biased in position. The upper end 13 of the frame 11 is provided with a bracket 15 adapted to engage the underside 17 of the dashboard 5 and anchor the top end 13 of the frame 11 in position. Preferably, the bracket 15 is slidably supported on the upper end 13 of the frame 11 by means of an opening 19 in the bracket through which the frame 11 extends so as to permit the bracket 15 to be moved to different positions along a portion of the length of the frame 11 and thereby permit the apparatus to be fitted in different vehicles each of which has its own particular height between the dashboard and floorboard. In the illustrated embodiment, the bracket 15 is provided with a contoured shape, as indicated at 21, adapted to fit under the lower edge 17 of the dashboard. The illustrated bracket 15 is secured in a selected position vertically along the frame 11 by means of a lock screw 23 which bears against the frame 11 to lock the bracket to the frame.

The lower end of the frame 11 is bifurcated to provide a pair of legs 25 and 27, each of which extends outwardly and downwardly from the frame to contact the floorboard 7 and anchor the bottom end of the frame 11 in juxtaposition to the accelerator 9. Preferably, the legs 25 and 27 are proportioned to straddle the accelerator pedal 9 and thereby position the frame 11 over the forward end of the accelerator pedal 9 as illustrated.

Figure 2:
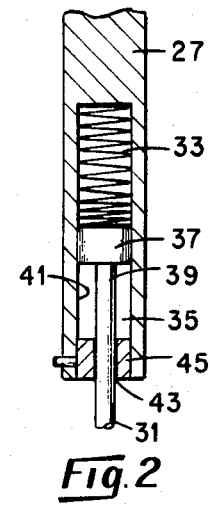
FIG. 2 is a fragmentary sectional view of the apparatus as seen along line 2—2 in FIG. 1.
Figure 3:
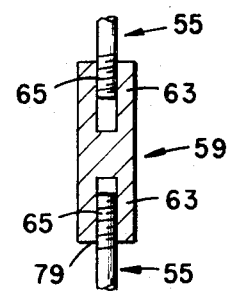
FIG. 3 is a fragmentary sectional view of the apparatus as seen along line 3—3 in FIG. 1.
Figure 4:
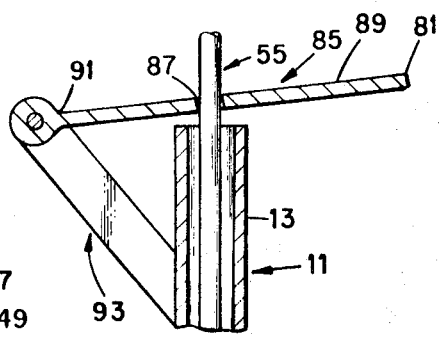
FIG. 4 is a fragmentary sectional view of the apparatus as seen along line 4—4 in FIG. 1.

Inasmuch as the bracket 15 which fits under the lower edge 17 of the dashboard 5 is adjustable along a portion of the length of the frame 11, the apparatus can be made to fit vehicles having dashboards of different heights above the floorboard so that the legs 25 and 27 may be rigid and without an adjustment feature. In the illustrated apparatus, each of the legs 25 and 27 is centrally bored to slidably receive an elongated rod 29 and 31, respectively, therein to provide a further adjustable mounting feature. As shown in detail in FIG. 2, each rod is biased in its extended position by means of a spring 33 housed within the central bore 35 in its respective leg. The rod 31 is maintained in the longitudinal center of the bore 35 by means of a flange 37 on the upper end 39 of the rod which bears against the inner wall 41 of the bore 35. The rod 31 further extends through a central opening 43 in a plug 45 fixed in the open end of the bore 35. This plug 45 also serves as a stop to halt the extension of the rod 31 from its leg 27.

The lower end 47 of each rod 29 and 31 is adapted to contact and bear against the floorboard 7 of the vehicle and anchor the bottom end of the frame 11 as referred to above. As necessary, a pad 49 is provided on the lower end of each rod to enhance the frictional engagement between the rod and floorboard 7. Thus, it will be seen that the frame 11 may be fitted in vehicles having different distances between the dashboard and floorboard by adjusting the position of the bracket 15 and/or through the use of spring biased rods 29 and 31 in the legs 25 and 27, respectively. Moreover, the rods and springs in the opposite legs exert an upward thrust against the frame 11 which aids in keeping the bracket 15 securely pressed against the underside 17 of the dashboard 5 in position to anchor the top end 13 of the frame 11. Contrary to certain prior art devices, the present apparatus is removable so as to be transferable between vehicles while at the same time it is securely anchored in place and readily available for use. When the frame 11 is in position in the vehicle as set forth above, the forward end of the accelerator pedal 9 is below the bottom end of the tubular frame 11 as shown in FIG. 1. In the illustrated apparatus the accelerator pedal 9 is engaged and depressed by a foot 53 provided on the lower end of a vertical extending rod 55 which is slidably disposed within the hollow central portion of the tubular frame 11. In another embodiment the rod 55 may be slidably held in brackets disposed on the exterior of the frame 11.

The upper end 57 of the rod 55 is positioned centrally of the hollow interior of the frame 11 by means of a circumferential flange 59 whose outer circumference slidably engages the inner wall 61 of the tubular frame 11 to serve as a bearing surface between the rod 55 and the frame wall 61. In the illustrated embodiment, this flange 59 comprises a pair of sleeves 63 which are each internally threaded to receive a threaded portion 65 of the rod 55 thereby providing for easy assembly and/or disassembly of this portion of the apparatus. As depicted, the rod 55 extends out of the upper end 13 of the frame 11 for purposes which will appear hereinafter. The lower end 69 of the rod 55 passes through a central opening in a plug 71 fixed in the bottom end of the tubular frame 11.

The rod 55 is biased toward a retracted, i.e., upward, position within the frame 11 by means of a helical spring 73 disposed within the frame 11 and encircling a portion of the rod 55. The lower end 75 of the spring 73 bears against the fixed plug 71 and the upper end 77 thereof contacts the bottom end 79 of the flange 59 to urge the flange, hence the rod 55, upwardly.

When the rod 55 is in its retracted position, the foot 53 is out of contact with the accelerator 9 and the apparatus is inoperative. To place the apparatus in its operative position, the foot 53 is moved downwardly by either applying a downward force on the top end 57 of the rod 55 or by pushing down on the foot 53 to cause it to engage and depress the accelerator 9. A rounded knob 83 is advantageously employed to permit the driver to use his hand to push the rod 55 downwardly if this mode of activation is chosen.

The desired depressed position of the accelerator 9 is maintained by locking the rod 55 against upward movement in response to the urging of the spring 73. This is accomplished in the depicted apparatus by means of a latch or jam lock indicated generally by the numeral 85. In the illustrated lock, the rod 55 is passed through an opening 87 in a lever 89 which is pivotally anchored at one of its ends 91 to a projection 93 extending generally outwardly and upwardly from the top end 13 of the frame 11. The opening 87 in the lever 89 is of a dimension slightly greater than the outside dimension of the rod 55 which passes therethrough so that when the lever 89 is disposed substantially horizontally (i.e., substantially normally with respect to the rod 55) and resting against the top end 13 of the frame 11, the rod 55 readily slides in the opening 87 and is free to move either up or down. By moving the lever 87 up away from such horizontal position, the edges of the opening 87 in the lever 89 are caused to engage, i.e., jam, the rod 55 and frictionally hold it against upward movement until such time as the lever 89 is again restored to its horizontal position against the top end 13 of the frame 11. Accordingly, after the foot 53 has been moved into engagement with the accelerator 9 and the rod 55 is in that extended position wherein the accelerator is depressed by the desired amount, the driver locks the rod 55 in such extended position by lifting upward on the unattached end 81 of the locking lever 89 to move it away from its horizontal position by a relatively small degree, depending upon the relative dimensions of the opening 87 and the rod 55. While the lever 89 is so held up, the downward force on the rod 55 is released so that it tends to move upwardly under the urging of the spring 73. This upward force also tends to urge the lever 89 further upward and further away from its horizontal position, thereby increasing the frictional locking engagement between the rod 55 and the lever 89 to the extent that the rod is jam locked with the lever.

The accelerator 9 is released to return to its normal nondepressed position by returning the lock lever 89 to its horizontal position against the top end 13 of the frame 11 so that the rod 55 is free to move upwardly under the biasing force of the spring 73. Such movement of the lever 89 and release of the rod 55 is accomplished in the depicted apparatus by either of several means. First, the release may be effected by pushing down on the foot 53 so that the frictional engagement between the rod and lever is relieved and the lever falls by gravity to a substantially horizontal position to free the rod 55 to move to its retracted, inoperative, position within the frame 11. Second, a like result is obtainable by pressing down on the knob 83 on the upper end 57 of the rod 55. Third, the rod may be similarly released by the driver pushing down on the unattached end 81 of the lever 89 to move it to its nonlocking horizontal position and thus free the rod 55 for retraction.

An additional release mechanism, particularly for safety purposes, is provided by connecting the unattached end 81 of the lever 89 to the vehicle brake pedal 95 as by means of a chain 97 or the like. In the illustrated apparatus, one end of the chain 97 is connected to a lug 99 on the end 81 of the lever 89, with the other end of the chain 97 being attached to the brake pedal by a clamp 101. A spring alligator type clamp is depicted but other clamping means will be evident. The chain 97 is divided along its length by a helical spring 103. The spring constant of this spring 103 is chosen to be less than that which will cause it to overcome the locking force between the lever 89 and the spring force which urges the rod 55 upwardly and maintains the aforedescribed locking engagement between the lever 89 and the rod 55 when the chain is connected tautly between the brake pedal 95 and the lever 89. The spring constant of the spring 103 is sufficiently great however that when the brake pedal 95 is depressed, the combination of the chain 97 and spring 103 exerts a downward pull on lever 89 sufficient to move the lever to its nonlocking horizontal position against the top end 13 of the frame 11 to release the rod 55 for retraction.

While a preferred embodiment has been shown and described, it will be understood that there is no intent to limit the disclosure, but rather, it is intended to cover all modifications and alternate constructions falling within the spirit and scope of the invention as defined in the appended claims. For example, rather than having the pedal 53 free to move independently of the accelerator 9 as depicted, the pedal may be releasably connected to the accelerator as by means of a resilient strap secured to the pedal and encircling the accelerator. By this latter means, the pedal is at all times maintained in position for depressing.

What is claimed is:

1. Apparatus for releasably maintaining the accelerator of a motor vehicle depressed comprising
    frame means adapted to be removably disposed uprightly between the floorboard and dashboard of said vehicle, said frame including an elongated first portion extending downwardly from said dashboard and terminating at a location above said accelerator, said first portion being substantially immovably secured so that its longitudinal axis remains oriented along a line running generally from a point above said accelerator to the point of attachment of said frame to said dashboard, and a second portion laterally offset from said first portion and extending therefrom toward said floorboard, leg means slidably disposed on said second portion and spring-biased toward an extended position, said leg means being adapted to contact said floorboard and urge said frame means toward said dashboard, said leg means contacting said floorboard at a location spaced apart from said accelerator by a distance sufficient to permit normal operation of said accelerator by an operator's foot, means releasably anchoring the upper end of said frame to said dashboard, accelerator contact means slidably mounted by said frame and movable between nonoperative and operative positions in a direction generally parallel to said longitudinal axis of said first portion of said frame means, said contact means bearing against said accelerator to maintain it depressed when in said operative position, spring means biasing said accelerator contact means toward its nonoperative position out of contact with said accelerator, and latch means releasably securing said accelerator contact means in its operative position.

2. The apparatus of claim 1 wherein said frame is bifurcated at its lower end to define opposite legs which contact said floorboard at locations on opposite sides of said accelerator so that said frame is disposed generally above said accelerator.

3. The apparatus of claim 2 wherein each of said legs is tubular and includes a rod-like member slidably disposed therein whereby said rod-like member in each leg is movable to an extended position to adjustably increase the effective height of said apparatus above said floorboard.

4. The apparatus of claim 3 and including spring means associated with each rod-like member and biasing it toward its extended position with respect to its respective leg.

5. The apparatus of claim 1 wherein said latch means comprises a lever pivoted at one of its ends and extending generally horizontally over said frame, said lever having an opening therein through which said accelerator contact means slidably moves, said opening being dimensioned such that when said lever is disposed generally normal with respect to said accelerator contact means said contact means readily moves therein but when said lever is disposed substantially nonhorizontally said contact means frictionally contacts the side edges of said opening and jams said contact means against movement in said opening.

6. The apparatus of claim 5 wherein said vehicle includes a brake pedal and including linkage connecting said lever to said brake pedal whereupon depression of said brake pedal moves said lever to its horizontal position to release said accelerator contact means.

* * * * *